Figure 1A:
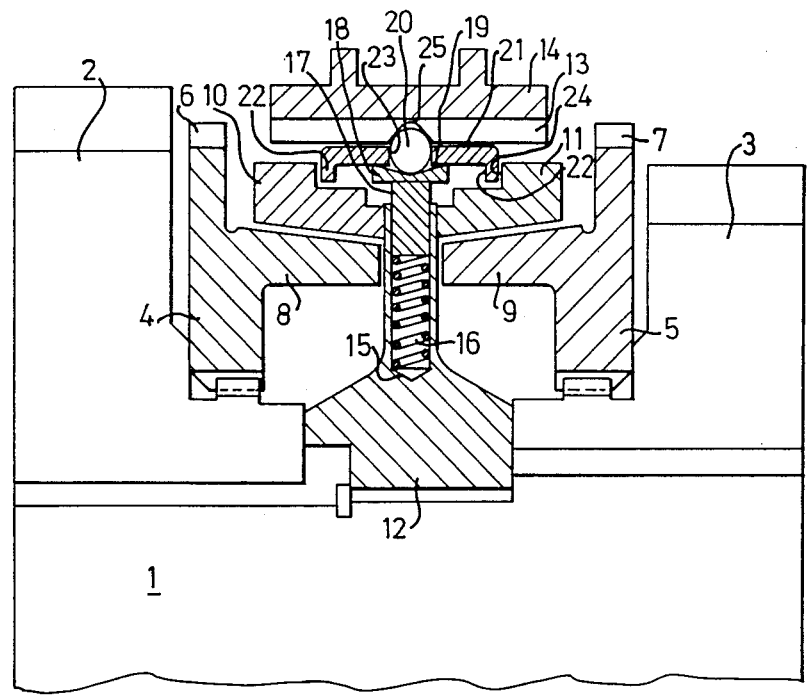

United States Patent [19]

Elverdam

[11] Patent Number: 4,712,662
[45] Date of Patent: Dec. 15, 1987

[54] GEARBOX SYNCHRONIZER

[75] Inventor: Peter Elverdam, Mölndal, Sweden

[73] Assignee: AB Volvo, Gothenburg, Sweden

[21] Appl. No.: 786,856

[22] Filed: Oct. 11, 1985

[30] Foreign Application Priority Data

Oct. 11, 1984 [SE] Sweden ................... 8405095

[51] Int. Cl.[4] ............................................. F16D 23/06
[52] U.S. Cl. ..................................... 192/53 F; 74/339
[58] Field of Search ................... 192/53 F, 53 G, 51, 192/43; 74/339, 369

[56] References Cited

U.S. PATENT DOCUMENTS

| 2,221,893 | 11/1940 | White | 192/53 F |
| 2,221,894 | 11/1940 | White | |
| 3,620,338 | 11/1971 | Tomita | 192/53 F |
| 3,741,358 | 6/1973 | Magnier | 192/53 F |
| 4,059,178 | 11/1977 | Magg et al. | 192/53 F |

FOREIGN PATENT DOCUMENTS

| 2706661 | 8/1978 | Fed. Rep. of Germany . | |
| 1453277 | 10/1976 | United Kingdom . | |
| 2029519 | 3/1980 | United Kingdom . | |
| 2101240 | 1/1983 | United Kingdom | 192/53 F |

Primary Examiner—Carl D. Friedman
Assistant Examiner—Richard E. Chilcot, Jr.
Attorney, Agent, or Firm—Young & Thompson

[57] ABSTRACT

The invention relates to a transmission synchronizing device. A locating sleeve for the engaging sleeve is fixed on the main shaft. The locating sleeve is provided with radial bores, each housing a helical spring and a cylindrical element with a plate having a V-shaped cam surface for a roller. In the neutral position, the roller is lodged in a V-shaped groove in the engaging sleeve, thus providing it with a well defined neutral position. The roller is held in a hole in a pusher plate, which during gear engagement pushes a synchronizer ring against a cone on an engaging ring.

9 Claims, 7 Drawing Figures

GEARBOX SYNCHRONIZER

The present invention relates to a synchronizing device for a gearbox comprising a synchronizer ring made with a conical frictional surface, said synchronizer ring surrounding a synchronizer cone having a cooperating frictional surface, said synchronizer cone being securely joined to a gear rotatably journalled on a shaft, and comprising as well an engaging sleeve non-rotatably but axially displaceably mounted on a locating sleeve, by means of which engaging sleeve the synchronizer ring can be displaced axially from a neutral position to bring the frictional surfaces into engagement with each other, said locating sleeve supporting radially acting spring means which load roller or slide bodies into contact with the engaging sleeve, which is provided with cavities in which said bodies engage in the neutral position.

An axially displaceable engaging sleeve, used to alternately lock one of two gears journalled adjacent to each other on a shaft, usually has an intermediate neutral position, in which both gears are disengaged from the shaft. In this position, the engaging sleeve and the components cooperating therewith which act on the synchronizer rings, should lie as close to the center position as possible, so that the two synchronizer rings will be allowed to move equally far in towards the center position. If the neutral position of the engaging sleeve falls to one side of the center position, one of the synchronizer rings will not be able to move as far towards the center position as the other ring, and this will result in increased risk of wear, heat and energy losses. In extreme cases, the synchronizer ring can be completely prevented from moving away from the synchronizer cone on the engaging ring, which results in greatly increased wear.

A clearly defined neutral position can be obtained in principle in two ways. Either the neutral position can be defined directly in the synchronizing and engaging device, or the position can be defined by the selector mechanism for the gearbox. In the latter case, the neutral position is often placed in the selector housing of the gearbox, which means that there will be a single neutral position for all of the gear speeds. This is, however, a compromise, which seldom provides satisfactory agreement between the center position and the neutral position for all gears. Precision is also sacrificed due to play between the gear selector and the shift rod, between the shift rod and the fork and between the fork and the engaging sleeve. The latter play must be relatively large to prevent the tines of the fork from coming into contact with the sleeve and being unnecessarily worn down. When the gearbox is in the neutral position, there must be some play between the synchronizer rings and those components which act on the rings via the engaging sleeve. This means that the less precise the position of the engaging sleeve is, the greater must be the nominal play. This play reduces precision and requires greater clearance.

One method of eliminating the effect of the play is to define the neutral position directly in the synchronizing device. In a known synchronizing device of the type described in the introduction above, a well defined neutral position is obtained by mounting the locating sleeve of the engaging sleeve axially displaceable on a hub on the shaft, the locating sleeve having radial bores, in which radially inwardly spring-loaded balls are housed, which in the neutral position snap into V-shaped cavities in the hub. During the initial movement of the engaging sleeve from the neutral position, the locating sleeve is pushed into contact with the synchronizer ring, which is then pressed against the synchronizer cone of the engaging ring. Thus there can be no contact established between the locating sleeve and the synchronizing cone, which means that the clearance between them in the synchronizing position must be greater than the allowance for wear, i.e. the allowable change in the axial position of the synchronizer ring on the cone due to wear on the frictional surfaces. This in turn affects the installation dimensions.

The purpose of the present invention is to achieve a synchronizing device of the type described by way of introduction, which has such a basic arrangement that it can be designed to provide a precisely defined neutral position with the synchronizing cones of the engaging rings placed at a minimum distance from the locating sleeve.

This is achieved according to the invention by virtue of the fact that the locating sleeve is fixed on the shaft and that the spring means load said bodies via radially movable cam elements, relative to which the bodies are axially displaceable, each body being guided by a pusher which is axially displaceable together with the body and which, as the engaging sleeve moves in the engagement direction, pushes the synchronizer ring to move the frictional surfaces into engagement with each other.

In a synchronizing device of this type, the well defined neutral position is obtained quite simply by making the cam element with a V-shaped profile in the axial direction, so that the roller or slide body is urged towards the center position by the cam surface under the influence of the spring force. It is possible to change the defined position merely by modifying the shape of the cam surface. If the synchronizing device is to be used in a so-called range gearbox for example, which does not have any neutral position, only two shift positions, the cam surface can be made with an inverted V-shaped profile, so that the cam surface then urges the roller or slide body towards one or the other shift position. The advantage of using a fixed locating sleeve is not only that the installation length can be shortened in comparison with the above mentioned known design with a movable locating sleeve; the synchronizing device is also simpler and less expensive due to the elimination of the hub for the locating sleeve.

Figure 1B:
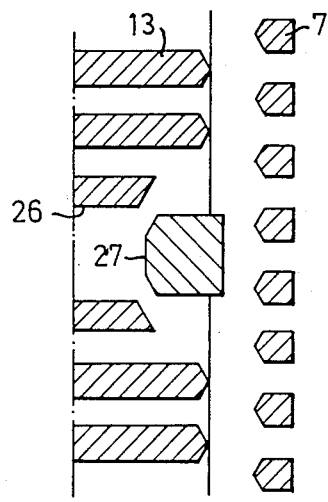
Figure 2A:
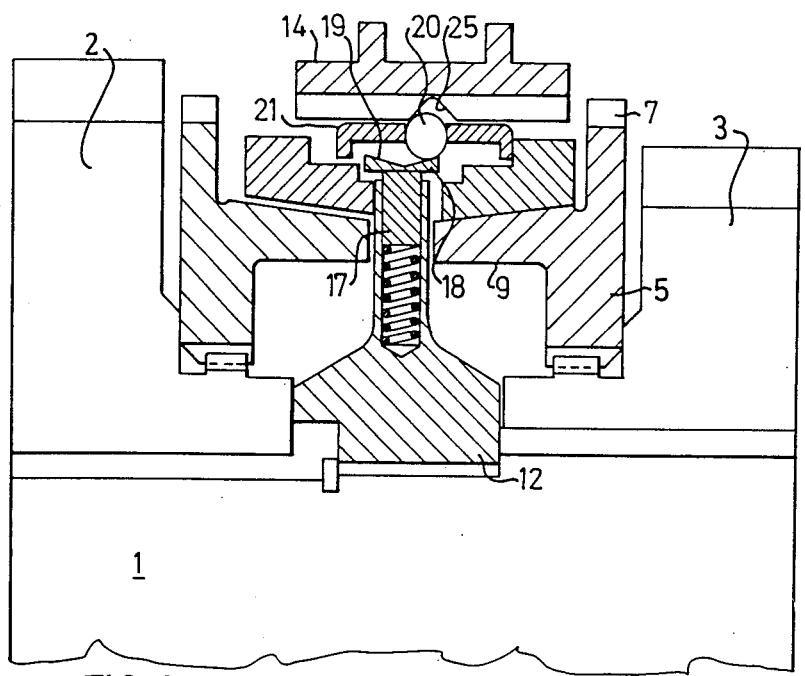
Figure 2B:
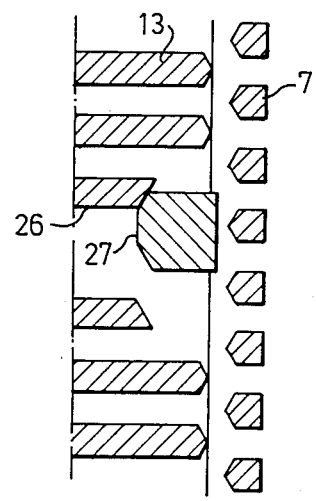
Figure 3A:
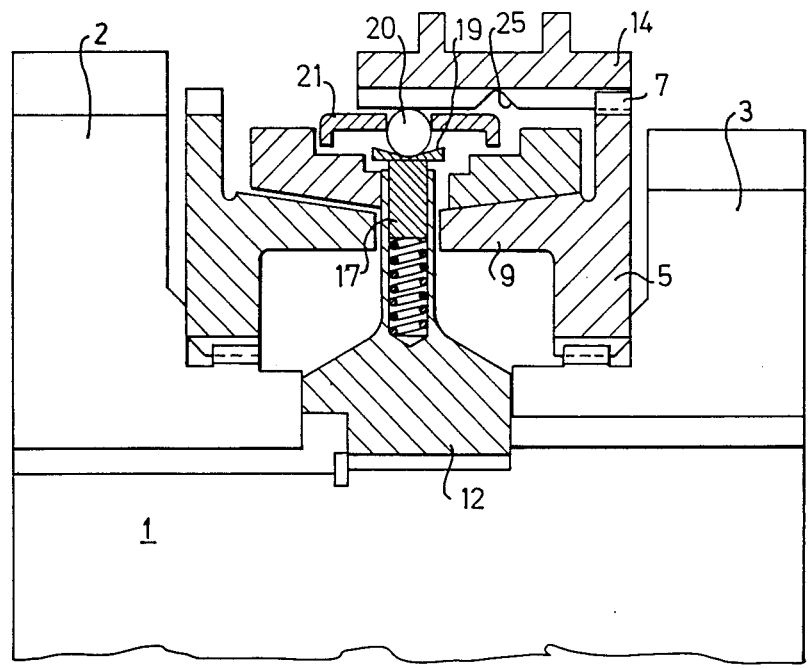
Figure 3B:
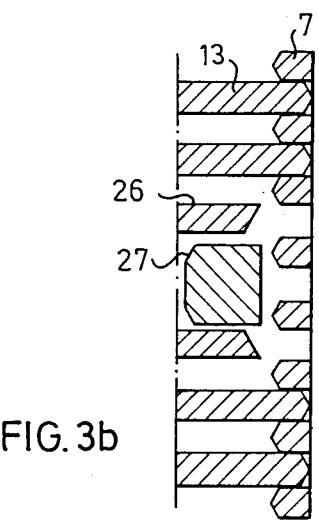
Figure 4:
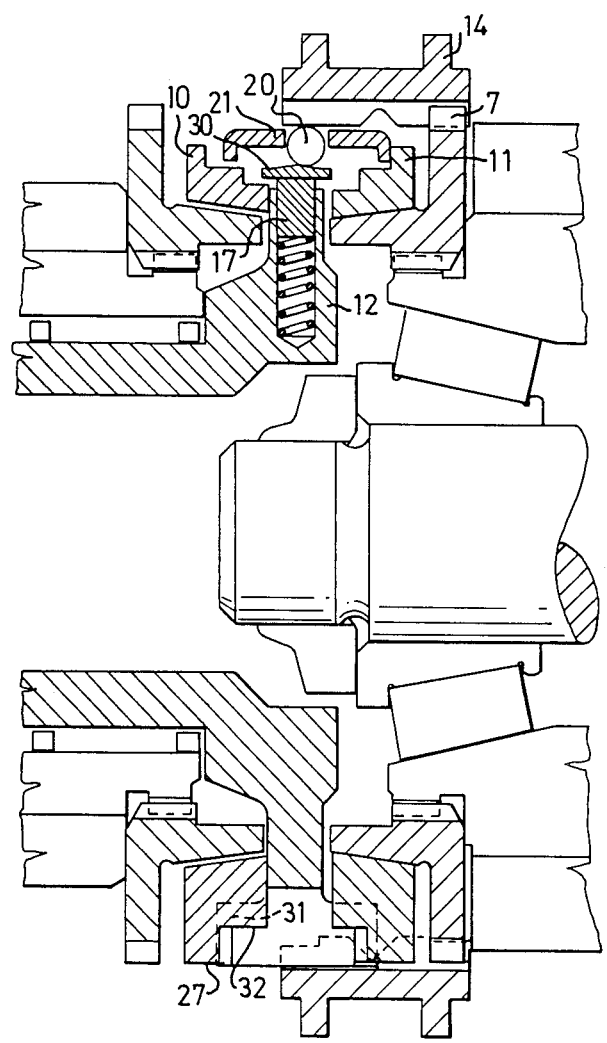

The invention will be described in more detail with reference to the examples shown in the accompanying drawings, of which FIGS. 1a, 2a and 3a, respectively, show an axial section through a synchronizing device according to the invention in the neutral position, the synchronizing position and the engaged position, respectively;

FIGS. 1b, 2b and 3b, respectively, show flat views of the teeth of the engaging sleeve, the synchronizing ring and the engaging ring in said respective positions, and FIG. 4 shows the synchronizing device in a modified embodiment.

In the FIG. 1 designates a main shaft in a vehicle gearbox, on which shaft two gears 2 and 3 are freely rotatably mounted. Each gear is non-rotatably joined to an engaging ring 4 and 5, respectively, which is provided with external teeth 6 and 7, respectively, and a synchronizer cone 8 and 9, respectively, carrying a synchronizer ring 10 and 11, respectively. Between the gears 2,3, there is arranged a so-called locating sleeve 12, which is non-rotatably joined to the shaft and is provided with external teeth (not shown) in engagement with internal teeth 13 in the engaging sleeve 14, which is axially displaceable into engagement with the teeth 6,7 of one or the other engaging ring to lock the associated gear 2,3 to the main shaft.

The locating sleeve 12 has a number (for example three or six) of evenly spaced radial bores 15, each holding a helical spring 16 and a cylindrical element 17, which is loaded radially outwards by the spring 16. At the outer end of the cylindrical element 17, a plate 18 is fixed, which has a V-shaped external surface 19, forming a cam surface for an antifriction body in the form of a roller 20. A plate 21 with downwardly bent end portions 22 holds the roller 20 in a roller-shaped hole 23, so that the roller can roll in the hole. The plate 21 forms a pusher, which, when the engaging sleeve 14 is displaced, pushes one or the other of the synchronizing rings 10,11 towards engagement through contact between the respective downwardly bent end portion 22 and an abutment surface 24 on the appropriate synchronizing ring.

In the neutral position (FIGS. 1a and 1b) the roller 20 rests in the center of the cam surface 19, which, by virtue of its V-shape and the influence of the spring force, strives to maintain this position of the roller, in which the roller extends into a V-shaped groove 25 in the facing internal teeth of the engaging sleeve 14. Cooperation between said components provides a well defined neutral position for the engaging sleeve, whereby it lies midway between the engaging rings 4,5, thus allowing the synchronizing rings to move equally far towards the center position.

When the engaging sleeve 14 is displaced to one or the other engagement position, it passes first the synchronizing position (see FIGS. 2a and 2b) in which, via the roller 20 and the pusher 21, it presses the synchronizer ring 11 against the synchronizer cone 9 while the roller 20 and the cylindrical element are depressed somewhat against the force of the spring 16, which thus determines the contact force. Oil is pressed out and friction increases between the ring 11 and the cone 9, whereupon the ring 11 is turned to the blocking position shown in FIG. 2b, in which the interacting teeth 26 and 27, respectively, of the engaging sleeve 14 and the ring 11, respectively, prevent continued displacement of the engaging sleeve 14 until synchronization is complete.

When the synchronizing ring 11 and the engaging ring 5 have the same rotational speed, the engaging sleeve 14 can continue its displacement to the engagement position shown in FIGS. 3a and 3b. Under the influence of the V-shaped cam surface, the roller 20 is then moved back to the center position together with the pusher 21. When the engaging sleeve 14 is subsequently moved back to neutral, a well defined position is provided for the sleeve when the roller 20 snaps into the V-shaped groove 25 in the engaging sleeve.

The synchronizing device described above can be simply modified to provide other defined positions than the neutral position for the pusher 21. Two well defined positions can be obtained for example by changing the cam surface to the shape of an inverted V.

Such an embodiment is shown in FIG. 4, employed in a so-called split transmission, which has two defined shift positions but without any neutral position. Parts corresponding to those in FIGS. 1-3 have been given the same reference numerals in FIG. 4. The only difference between the actual synchronizing device in FIG. 4 and that shown in FIG. 1-3 is that the V-shaped cam surface 19 has been replaced in FIG. 4 with an inverted V-shaped cam surface 30. The lower portion of FIG. 4 also shows the engagement between the synchronizing rings 10 and 11 and the locating sleeve 12 by means of alternating grooves 31 and splines 32. This also applies to the embodiment shown in FIGS. 1-3.

The basic functional and design principle of the invention can also be used in synchronizing devices which do not require any defined position for the pusher 21. The cam surface can in this case be entirely flat. The term "cam element" in the subsequent claims thus encompasses even elements with a flat surface for the roller or slide body.

Instead of the above described roller 20, other antifriction bodies can also be used, balls for example. The advantage of using a roller is, however, that line contact is obtained with adjacent components while a ball only provides point contact. It is also possible to use antifriction bodies in the form of suitably shaped slide bodies which slide against the facing components, but the risk of jamming in the hole in the pusher can be significant due to the so-called "stick-slip" effect.

I claim:

1. In a synchronizing device for a gearbox, comprising a synchronizer ring having a conical frictional surface, said synchronizer ring surrounding a synchronizer cone having a cooperating frictional surface, said synchronizer cone being securely joined to a gear rotatably journalled on a shaft, and comprising as well an engaging sleeve non-rotatably but axially displaceably mounted on a locating sleeve, by means of which engaging sleeve the synchronizer ring can be displaced axially from a neutral position to bring the frictional surfaces into engagement with each other, said locating sleeve supporting radially acting spring means which load antifriction bodies into contact with the engaging sleeve, which is provided with cavities in which said bodies engage in the neutral position; the improvement in which the locating sleeve is fixed on the shaft and the spring means load said bodies into direct contact with said engaging sleeve via radially movable cam elements, relative to which the bodies are axially displaceable, said cam elements having cam surfaces thereon that are oppositely inclined radially in opposite axial directions from the position on the cam elements occupied by the bodies in said neutral position, said bodies being in direct rolling contact with said cam surfaces, each body passing freely through a hole in a pusher which is axially displaceable together with the body and which, as the engaging sleeve moves in the engagement direction, pushes the synchronizer ring to move the frictional surfaces into engagement with each other.

2. Synchronizing device according to claim 1, in which each cam elment has a cam surface so shaped that the associated antifriction body is loaded by an axially directed force under the influence of the spring means.

3. Synchronizing device according to claim 2, in which each cam element has a cam surface with a V-shaped axial profile, thus urging the associated antifriction body towards the neutral position.

4. Synchronizing device according to claim 1 in which the plate has at least one radially inwardly bent end portion, the end surface of said plate forming an abutment surface cooperating with a surface on the synchronizing ring.

5. Synchronizing device according to claim 1 in which the antifriction bodies are cylinders.

6. Synchronizing device according to claim 1 in which the antifriction bodies are balls.

7. Synchronizing device according to claim 1, in which said synchronizing ring is in two parts which are axially movable relative to each other and only a respective one of which is moved axially by said pusher in each direction of axial movement of said pusher.

8. In a synchronizing device for a gearbox, comprising a synchronizer ring having a conical frictional surface, said synchronizer ring surrounding a synchronizer cone having a cooperating frictional surface, said synchronizer cone being securely joined to a gear rotatably journalled on a shaft, and comprising as well an engaging sleeve non-rotatably but axially displaceably mounted on a locating sleeve, by means of which engaging sleeve the synchronizer ring can be displaced axially from a neutral position to bring the frictional surfaces into engagement with each other, said locating sleeve supporting radially acting spring means which load antifriction bodies into contact with the engaging sleeve, which is provided with cavities in which said bodies engage in the neutral position; the improvement in which the locating sleeve is fixed on the shaft and the spring means load said bodies into direct contact with said engaging sleeve via radially movable cam elements, relative to which the bodies are axially displaceable, said cam elements having cam surfaces thereon that are oppositely inclined radially in opposite axial directions from the position on the cam elements occupied by the bodies in said neutral position, said bodies being in direct rolling contact with said cam surfaces, each body passing freely through a hole in a pusher which is axially displaceable together with the body and which, as the engaging sleeve moves in the engagement direction, pushes the synchronizer ring to move the frictional surfaces into engagement with each other, each cam element having a cam surface with an inverted V-shaped axial profile, whereby the associated antifriction body is urged toward one or the other of the two engagement position.

9. In a synchronizing device for a gearbox, comprising a synchronizer ring having a conical frictional surface, said synchronizer ring surrounding a synchronizer cone having a cooperating frictional surface, said synchronizer cone being securely joined to a gear rotatably journalled on a shaft, and comprising as well an engaging sleeve non-rotatably but axially displaceably mounted on a locating sleeve, by means of which engaging sleeve the synchronizer ring can be displaced axially from a neutral position to bring the frictional surfaces into engagement with each other, said locating sleeve supporting radially acting spring means which load antifriction bodies into contact with the engaging sleeve, which is provided with cavities in which said bodies engage in the neutral position; the improvement in which the locating sleeve is fixed on the shaft and the spring means load said bodies into direct contact with said engaging sleeve via radially movable cam elements, relative to which the bodies are axially displaceable, said cam elements having cam surfaces thereon that are oppositely inclined radially in opposite axial directions from the position on the cam elements occupied by the bodies in said neutral position, said bodies being in direct rolling contact with said cam surfaces, each body passing freely through a hole in a pusher which is axially displaceable together with the body and which, as the engaging sleeve moves in the engagement direction, pushes the synchronizer ring to move the frictional surfaces into engagement with each other, each cam element being formed of a cylindrical member slidably mounted in a radial bore in the locating sleeve and loaded by a helical spring, and a plate fixed to the outwardly directed end of said member, said plate supporting the antifriction body.

* * * * *